United States Patent Office 3,378,386
Patented Apr. 16, 1968

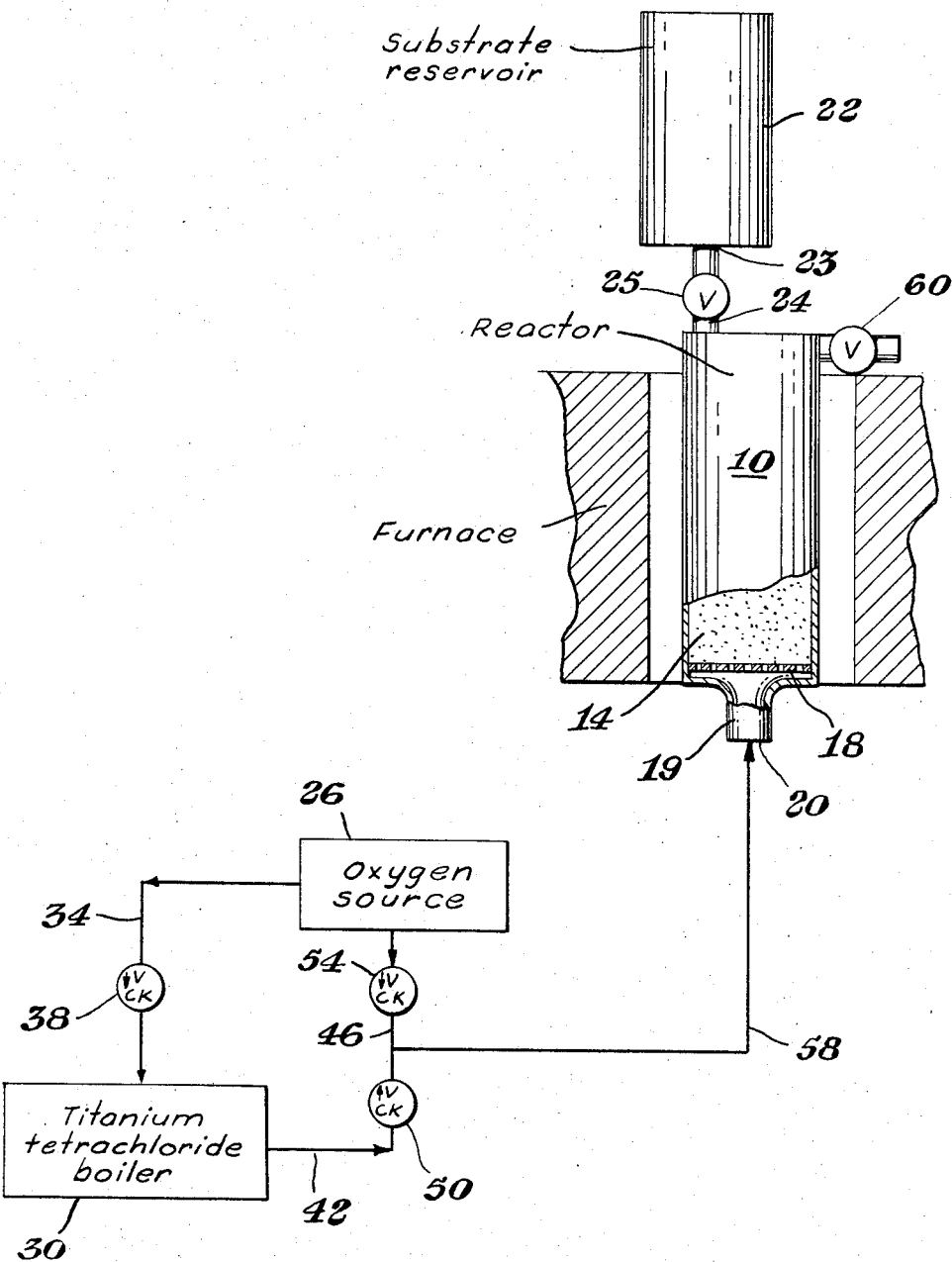

3,378,386
METHOD OF PREPARING COMPOSITE PIGMENTS
James J. Leddy, Midland, Mich., assignor to The Dow Chemical Company, Midland, Mich., a corporation of Delaware
Filed Sept. 16, 1963, Ser. No. 309,086
9 Claims. (Cl. 106—288)

The invention relates to a method of preparing composite pigments containing titanium dioxide and, more particularly, to a method of forming titanium dioxide directly on the surface of various substrates by high temperature oxygenation of titanium tetrachloride directly thereon.

The method of this invention produces a composite pigment useful, for example, in latex paint formulations to increase brightness and opacity of said paints, in coloring plastics and in the manufacture of paper as a filler pigment thus increasing the brightness of the paper.

Methods for coating substrates with titanium dioxide heretofore disclosed may be classified as follows: (1) Those in which a titanium species is hydrolyzed in the presence of the pigment extender substance (or substrate, i.e., a solid particulate material suitable for use in paint pigments, fillers and pigment extenders) in an aqueous sulfate medium. (2) Those in which the dioxide is mixed or blended with the desired extender pigment, either by wet or dry grinding.

It has been discovered that pigments with properties comparable to those produced by known methods can be obtained in the preparation of a composite pigment by forming a titanium dioxide coating directly on the surface of the particles of substrate according to the method of the invention, without need for sulfate solutions or blending techniques, which results in economy of operation over the aforementioned methods.

Thus, it is an object of the method of the present invention to provide an improved method for producing a composite pigment which is comparable in hiding or covering power to composite pigments made by known methods, but which may be carried out economically on a commercial scale.

An additional object of the method of the instant invention is to produce a composite pigment by contacting titanium tetrachloride with the particles of a substrate bed in the presence of oxygen while said bed is at a temperature in the range of from 850° to 1200° C. thereby forming titanium dioxide on the surface of the substrate without any blending technique being necessary and without immersing the substrate in an acidic solution.

In accordance with the invention, titanium tetrachloride is reacted with oxygen on the surfaces of the solid particles of a relatively dry substrate bed to produce a composite pigment consisting of a substrate coated with titanium dioxide by passing a gas stream, such as air or oxygen, up through the substrate bed so as to fluidize said bed while heating said bed to a temperature in the range of from about 850° to 1200° C. and then including the vapor of titanium tetrachloride in the fluidizing gas so as to treat the heated substrate with the vapor of titanium tetrachloride. The titanium tetrachloride reacts with the oxygen initially taken up by the substrate thereby to form titanium dioxide in situ as a coating on the substrate particles and chlorine which is carried away by the fluidizing gas and vented to a convenient source. The coated particulate material so obtained possesses desirable properties as a pigment.

The above fluidization may be performed at room temperature. However, the contacting of the titanium tetrachloride with the surface of the particles of substrate in the presence of oxygen should occur while the substrate bed is heated to a temperature within the above-indicated range.

The invention, as well as additional objects and advantages thereof, will be best understood when the following detailed description is read in conjunction with the accompanying drawing in which the single figure shows schematically an apparatus for use in carrying out the method of this invention.

In the figure, a reactor vessel, indicated generally by numeral 10, in the form of a vertically disposed cylinder, which is adapted to hold a mass of substrate particles 14 is fitted with a frit as a porous plate 18 near the bottom for supporting the substrate. The bottom closure 19 of the cylinder is provided with an opening 20 for the admission of gas or vapor which passes up through the frit. A reservoir 22, adapted to hold a supply of substrate particles, has an outlet 23 connected by pipe 24 having a valve 25 therein to vessel 10. A supply source for oxygen 26 is connected to a boiler 30 containing titanium tetrachloride by a pipe 34 having a one-way check valve 38 therein. Said titanium tetrachloride boiler and oxygen source are connected by pipes 42 and 46, respectively, having one-way check valves 50 and 54, respectively, therein to pipe 58, as shown, which is, in turn, connected to the bottom of the reactor vessel 10, as shown. The side wall of the vessel 10 is surrounded by a heating furnace adapted to heat the vessel and contents.

In carrying out the invention using the apparatus as shown in the figure, substrate material is introduced into the reactor vessel 10 from reservoir 22 by opening valve 25. Oxygen is passed into the reactor vessel through the frit 18 by opening valve 54 at a rate sufficient to fluidize the substrate bed. At the same time, the substrate bed is heated to a suitable working temperature, e.g., approximately 900° C., by the furnace. When the bed has reached a working temperature, valve 38 is opened so as to allow oxygen to enter boiler 30 and form a gas mixture with the titanium vapor and valve 50 is opened so as to allow the so-formed titanium tetrachloride vapor-oxygen mixture to pass into and through the heated fluidized bed. When the desired amount of titanium tetrachloride has passed into the bed, valve 38 is closed. The titanium tetrachloride reacts with the oxygen on the substrate bed to form a titanium dioxide coating on said substrate. The chlorine gas thus formed by the reaction is allowed to escape through venting means 60 which is kept opened during the operation.

In general, the substrate may consist of more or less equiaxed or other shape particles of average maximum dimensions of from 0.1 to 1 micron with a preferred average equal to 0.5 micron.

The composite pigment may be coated with a minimum of 4 to 5 percent titanium dioxide to insure reasonable hiding power in the pigment, with a preferred composite pigment being coated with about 20 percent titanium dioxide. Thus, a minimum weight ratio of 1 to 10 of titanium tetrachloride to substrate may be used as a starting mixture with the preferred ratio being 1 to 5. The oxygen is continuously passed through the titanium tetrachloride boiler and on through the substrate bed for a length of time sufficient to provide enough titanium tetrachloride for the reaction. This length of time is largely dependent on the amount of substrate present, the thickness of the titanium coating desired and, to a lesser extent, on the shape of the reactor vessel which determines the shape of the bed of substrate.

Materials which are suitable for use as substrates in the method of this invention are those which do not react adversely with titanium tetrachloride, chloride, titanium dioxide or hydrochloric acid and include kaolinite $(Al_2O_3 \cdot 2SiO_2 \cdot 2H_2O)$, hydrated calcium silicate (CaSiO$_3 \cdot$XH$_2$O)
anhydrous calcium silicate, hydrated magnesium silicate (MgSiO$_3 \cdot$XH$_2$O), anhydrous magnesium silicate, hydrated and anhydrous silica (SiO$_2$), meta-kaolin (Al$_2$Si$_2$O$_7$), aluminum silicon spinel (Al$_4$Si$_3$O$_{12}$) and talc

[Mg$_3$Si$_4$O$_{10}$(OH)$_2$]

The process of the instant invention may be carried out at atmospheric pressure and at temperatures ranging from 850° to 1200° C., although about 900° C. is preferred.

The substrate may be fluidized by blowing dry air or any dry inert gas through the bed and the same gas used to carry the titanium tetrachloride vapor into contact with the substrate particles. The addition of catalysts to the reactants which are known in the art of high temperature oxygenation of titanium tetrachloride, e.g., aluminum trichloride, may be used to assist in oxidizing the titanium tetrachloride.

The following example is illustrative of the invention.

EXAMPLE

Apparatus was assembled as illustrated in the figure. Seventy-five grams of kaolinite having an average particle size of 0.5 micron, used as a substrate, was added to a cylindrically shaped reactor having a diameter equal to 2 inches and a length equal to 24 inches and dried therein by heating said substrate up to 900° C. for 5 minutes. While maintaining the temperature at 900 C., oxygen was passed through the titanium tetrachloride boiler for ten minutes and subsequently through the substrate bed whereby said bed was fluidized. During this time, 12 milliliters of titanium tetrachloride was vaporized and the vapor introduced into the reactor by the oxygen. In the ensuing reaction, the surface of the kaolinite particles became coated with titanium dioxide forming a composite pigment which was found to be especially suitable as a filler pigment for paper.

Various modifications can be made in the process of the present invention without departing from the spirit or scope thereof, for it is to be understood that I limit myself only as defined in the appended claims.

What is claimed is:

1. In a process for preparing a composite pigment by reacting titanium tetrachloride with oxygen on the surface of the particles of a substrate bed the improvement which comprises;
    (a) providing a particulate substrate bed member selected from the group consisting of kaolinite, hydrated calcium silicate, anhydrous calcium silicate, hydrated magnesium silicate, anhydrous magnesium silicate, hydrated silica, anhydrous silica, meta-kaolin, aluminum silicon spinel, talc and mixtures thereof, the particles of said substrate bed having an average maximum dimension of from about 0.1 to about 1 mircon,
    (b) passing a gas stream inert to said substrate up through said substrate bed while heating said bed to a temperature in the range of from about 850 to about 1200° C. thereby to fluidize said bed,
    (c) providing a boiling mass of titanium tetrachloride separate from said substrate bed,
    (d) passing a gas selected from the group consisting of dry air and oxygen through said boiling mass of titanium tetrachloride thereby providing a titanium tetrachloride vapor gas mixture,
    (e) transporting a predetermined amount of said titanium tetrachloride vapor-gas mixture to the heated fluidized substrate bed and passing said mixture up through said bed, the amount of said gas mixture being such to provide weight proportions of titanium chloride/particulate substrate bed at a minimum of about 1/10,
    (f) stopping the flow of said titanium tetrachloride vapor-gas mixture up through said fluidized bed while maintaining the flow of the fluidizing gas stream up through the titanium tetrachloride contacted heated substrate bed thereby providing a composite pigment of said substrate particles having a coating of titanium dioxide thereon, said coating content at a minimum being about 4 per cent of the total pigment.

2. The process as defined in claim 1 wherein the particles of the substrate bed are substantially equiaxed and have an average diameter of about 0.5 micron.

3. The process as defined in claim 1 wherein the substrate bed consists of kaolinite.

4. The process as defined in claim 1 wherein the amount of said titanium tetrachloride vapor-gas mixture which contacts the particulated substrate bed provides weight proportions of titanium chloride/particulate substrate bed of about 1/5.

5. The process as defined in claim 1 wherein the gas passed through said boiling titanium tetrachloride is oxygen.

6. The process as defined in claim 1 wherein the fluidized bed is maintained at about 900° C.

7. The process as defined in claim 1 wherein the fluidizing gas is a member selected from the group consisting of air and oxygen and including the step of passing a predetermined amount of said fluidizing gas through said boiling mass of titanium tetrachloride thereby to provide said titanium tetrachloride vapor-gas mixture.

8. The process as defined in claim 7 wherein the substrate is substantially equiaxed particulated kaolinite having an average diameter of about 0.5 micron and wherein the titanium tetrachloride vapor-gas mixture which contacts the particulated substrate bed provides weight proportions of titanium chloride/particulate substrate bed of about 1/5.

9. The process as defined in claim 7 wherein the fluidizing gas is oxygen.

References Cited

UNITED STATES PATENTS

| | | | |
|---|---|---|---|
| 2,760,846 | 8/1956 | Richmond et al. | 106—300 |
| 3,109,708 | 11/1963 | Walmsley | 106—300 |
| 3,117,883 | 1/1964 | Gilchrist | 106—300 |
| 3,148,027 | 9/1964 | Richmond | 106—288 |
| 3,151,993 | 10/1964 | Bundy | 106—72 |
| 3,219,468 | 11/1965 | Evans et al. | 106—308 |
| 3,245,818 | 4/1966 | Evans et al. | 106—300 |

FOREIGN PATENTS 487,857   6/1938   Great Britain.

TOBIAS E. LEVOW, *Primary Examiner.*

S. E. MOTT, *Assistant Examiner.*